United States Patent [19]
Garcia et al.

[11] Patent Number: 5,047,653
[45] Date of Patent: Sep. 10, 1991

[54] DEVICE ON BOARD A MOVING VEHICLE TO OBTAIN SIGNALS REPRESENTATIVE OF THE RELATIVE SPEED OF THE VEHICLE WITH RESPECT TO AN AMBIENT FLUID

[75] Inventors: James Garcia, Bondy; Gérard Beigbeder, Paris, both of France

[73] Assignee: Thomson-CSF, Puteaux, France

[21] Appl. No.: 543,081

[22] Filed: Jun. 25, 1990

[30] Foreign Application Priority Data

Jun. 30, 1989 [FR] France ............................. 89 08808

[51] Int. Cl.$^5$ ........................... G01P 3/36; G01B 9/02
[52] U.S. Cl. ................................. 250/574; 356/28.5; 356/342; 356/345; 250/235
[58] Field of Search ..................... 250/574, 234–236, 250/561, 573; 356/28.5, 342, 335, 336, 338, 339, 345, 28

[56] References Cited

U.S. PATENT DOCUMENTS

| | | | |
|---|---|---|---|
| 3,895,872 | 7/1975 | Dandliker et al. | 356/28.5 |
| 4,195,931 | 4/1980 | Hara | 356/346 |
| 4,263,002 | 4/1981 | Sathyakumar | 356/342 |
| 4,334,779 | 6/1982 | Domey et al. | 356/28.5 |
| 4,483,614 | 11/1984 | Rogers | 356/28.5 |
| 4,974,960 | 12/1990 | Dopheide et al. | 356/28.5 |

FOREIGN PATENT DOCUMENTS

| | | | |
|---|---|---|---|
| 0097468 | 8/1979 | Japan | 356/28.5 |
| 0099481 | 8/1979 | Japan | 356/28.5 |

Primary Examiner—David C. Nelms
Assistant Examiner—Michael Messinger
Attorney, Agent, or Firm—Oblon, Spivak, McClelland, Maier & Neustadt

[57] ABSTRACT

A device uses fringe laser diode anemometers which, from the beams coming from one or more laser diodes, form measuring volumes having interference fringes. The component of the relative speed of an aircraft in a direction perpendicular to the plane of these fringes is deduced from the modulation of light reflected by particles moving through the measuring volume to cause modulation of the signal of the photodetector of each anemometer during their passage in the measuring volume of this anemometer. By joining two anemometers with the measuring volumes whose planes of the associated fringes are, for example, orthogonal, it is possible to determine two components of the relative speed vector and determine, for example, this relative speed in the longitudinal vertical plane of the aircraft, and to deduce from it the angle of incidence of the aircraft.

19 Claims, 3 Drawing Sheets

DEVICE ON BOARD A MOVING VEHICLE TO OBTAIN SIGNALS REPRESENTATIVE OF THE RELATIVE SPEED OF THE VEHICLE WITH RESPECT TO AN AMBIENT FLUID

BACKGROUND OF THE INVENTION

1. Field of the Invention

The present invention generally relates to a device for obtaining signals representative of a relative speed of a vehicle with respect of an ambient fluid, and more particular to such a device employing fringe laser anemometers.

2. Discussion of the Background

To direct some moving vehicles, such as aircraft or some missiles, and even boats, the knowledge of their relative speed with respect to an ambient fluid is necessary. While a aircraft will be discussed below, it is understood that the following discussion is also valid, except for the type of fluid, for other types of vehicles whether they fly or move on the ground, on the water or under the water.

It is known, in an aircraft, to determine the relative speed of aircraft with respect to an ambient fluid from the signals provided by four probes including:

a static pressure probe whose sensitive surface is placed parallel to the airflow streams at a location where neither partial vacuums nor excess pressures occur, a total pressure probe whose sensitive surface is placed generally to the front of the aircraft, at least approximately perpendicular to its longitudinal axis, two clinometric probes, for example of the weather vane type, which give respectively the angle of incidence and the sideslip angle of the aircraft. As used here, the angle of incidence is defined as the angle that the relative speed vector makes relative to the wind with the chord of the wing of the aircraft, i.e. with the line which connects the foremost point and the rearmost point of the wing in a vertical section parallel to the plane of symmetry of the aircraft. Additionally, the sideslip angle is defined as the angle that the relative speed vector makes relative to the wind with the longitudinal axis of the aircraft. The knowledge of the angle of incidence is vital because it makes it possible to prevent the risks of stall.

These four probes form protuberances on an outside wall of the aircraft and as a result present various drawbacks. For example, the use of probes poses problems of mechanical strength in bad weather, as well as problems with the correct operation of the probes in any weather, in particular in icy weather. Additionally, the use of probes makes an aircraft more easily detectable by radar, which is a difficulty for the military aircraft. Further, the probes require, as a function of the angle of incidence, correction of the measurements made by the pressure probes. Moreover, the use of probes creates turbulence which increases drag.

SUMMARY OF THE INVENTION

This invention has as an object to avoid or at least to reduce these above-noted drawbacks.

These and other objects are obtained, according to advantageous embodiments of this invention, by the use of fringe laser anemometers, such as used on stationary supports, in closed spaces to measure airflow, by choosing those types of anemometers most able to be positioned on board a vehicle, and by adapting these anemometers to the special conditions of a measurement in free space.

According to one embodiment of the present invention, there is provided a device on board a moving vehicle for obtaining signals representative of a relative speed of the vehicle with respect to an ambient fluid, this device comprising n fringe laser anemometers, where n is a positive integer, each anemometer generating a measuring volume with a measuring axis for obtaining a measurement in free space. Each anemometer includes an emission source, for example, a laser diode, an optical filter whose passband is centered on the emission frequency of the laser diode, a photodetector and the measuring volume, the filter being placed on an optical path of the anemometer which extends between the measuring volume of the anemometer being considered and its associated photodetector. The photodetectors of the n anemometers provides signals for at least two separate directions of n measuring axes relative to the n anemometers to provide signals representative of the relative speed of the vehicle with respect to the ambient fluid.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
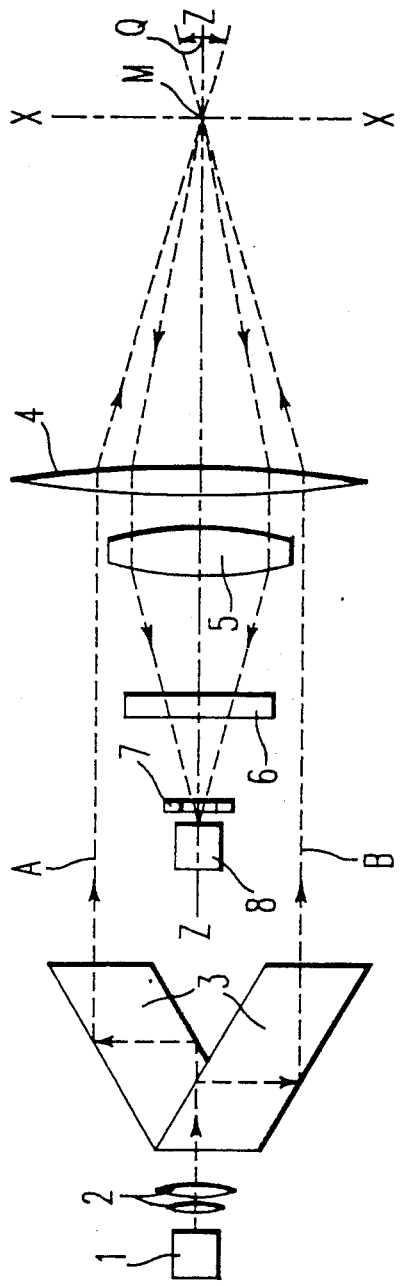
FIGS. 1 and 2 respective illustrate a side and front view of an anemometer usable in a device according to one embodiment of the invention.

Various other objects, features and attendant advantages of the present invention will be more fully appreciated as the same becomes better understood from the following detailed description when considered in connection with the accompanying drawings in which like reference characters designate like or corresponding parts throughout the several views.

FIG. 1 is a diagrammatic view of a laser diode anemometer having, in series on an optical plane, an emitting source, for example, a power laser diode 1, a collimation lens 2, an optical beam separator with semireflecting mirrors 3, an emission lens 4, a receiving lens 5, an interference filter 6, an iris 7 and a photodetector 8. This anemometer was developed by the French-German Research Institute of Saint Louis (France) but was modified by the addition of elements 6 and 7 whose role will be explained below.

The operation of the anemometer according to FIG. 1 is as follows. Laser diode 1 emits a monochromatic radiation. From this radiation, collimation lens 2 forms a light beam that it directs to an input of beam separator 3. The beam separator 3 divides the entering beam into two beams, A and B, which the beam separator 3 directs to emission lens 4. This emission lens 4 makes the two beams A and B converge toward a zone M, called a measuring volume, where interference fringes occur.

Figure 3:
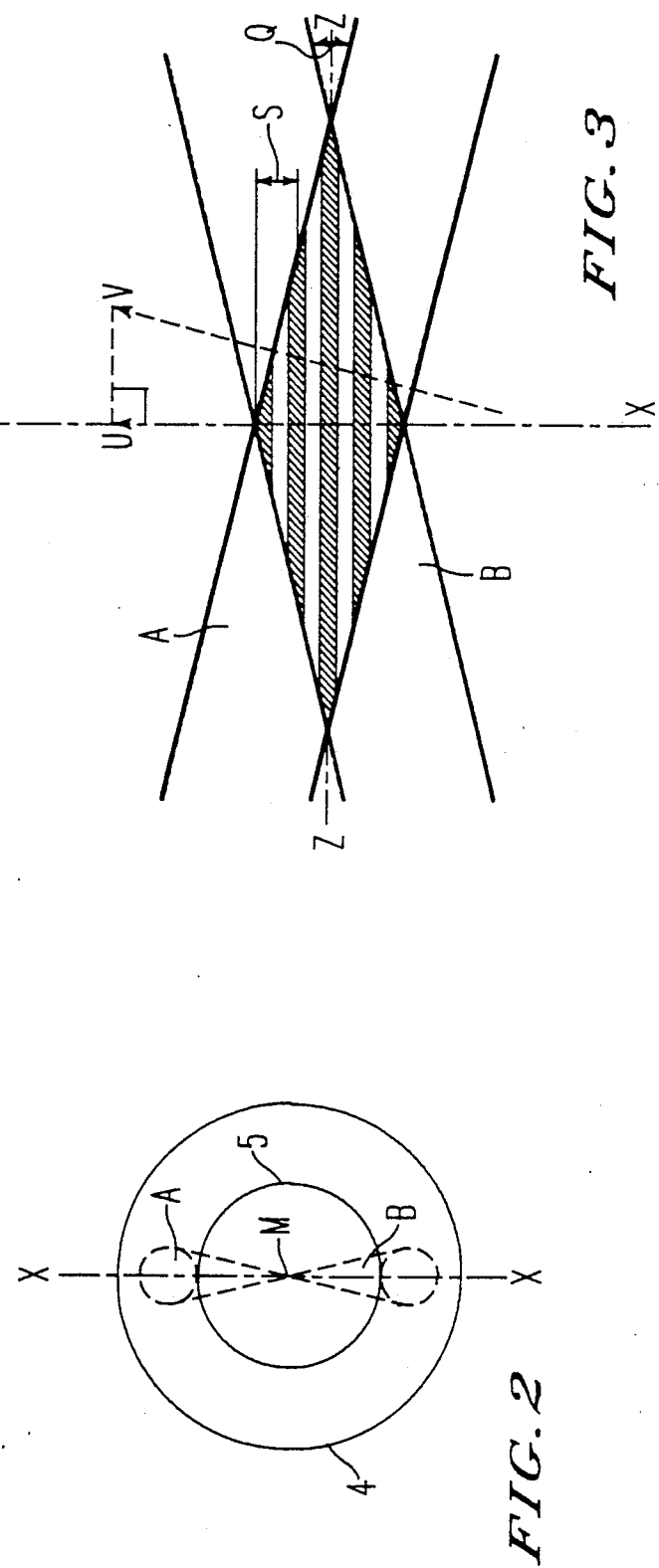
FIG. 3 is a view of a measuring volume of the anemometer according to the FIGS. 1 and 2.

These interference fringes are shown in FIG. 3, which is a greatly enlarged diagrammatic view of the measuring volume M, in a vertical plane passing through the laser diode 1 approximately at a center of volume M. The size of volume M varies as a function of the crosswise dimensions given to beams A and B and as a function of angle Q made by the beams A and B when they intersect. Preferably, the size of volume M is on the order of some hundreds of microns in length and on the order of some tens of microns in thickness and width.

The alternately bright and dark fringes, which are generated in volume M, are parallel to the bisecting plane of the two beams A and B. Distance s, separating the center of two consecutive fringes, is equal to the wavelength of the radiation of laser diode 1 divided by twice the sine of angle Q/2.

Because of the fringes, dust particles carried by the airflow flowing through volume M diffuse the light of the measuring volume M so that its intensity varies periodically at a frequency f proportionately to the speed V of the dust particles relative to the fringes of the measuring volume, or more precisely, as a linear function of component U of the speed V in direction XX perpendicular to the plane of the fringes. The direction XX constitutes what generally is hereinafter called the measuring axis of the anemometer. The relation which connects U, f and s is written:

$U = f \cdot s$ (except for the sign)

A part of the light thus diffused and reflected by the particles, which have penetrated volume M, successively penetrates emission lens 4 and receiving lens 5 to converge toward photodetector 8 by passing through interference filter 6 and iris 7. This reflected light, whose light intensity is modulated, produces a modulation of an electric signal at an output of photodetector 8 so that a simple measurement of the modulation frequency of this electric signal makes it possible to determine component U of the speed vector.

Interference filter 6 is an optical filter with a narrow passband centered substantial at the frequency of the emission line of diode 1. The role of interference filter 6 is to rid the light provided to photodetector 8 as much as possible of all light frequencies that do not come from diode 1 and more particularly of the sunlight. Without filter 6, photodetector 8 would be easily saturated, which would make any measurement impossible.

It should be noted that the laser diode anemometers, intended for use according to the present invention, which are described with respect to FIGS. 4-7, have been made with a laser diode whose emission line is at about 0.82 microns. However, a study is in progress to make laser diodes with emission lines at 1.4 and 1.9 microns. Such diodes will have the advantage of having an emission line located in a hole of the solar spectrum, therefore making possible, joined to filter 6, for photodetector 8 to receive practically no sunlight since the passband of the filter will be located entirely in this hole.

It also should be noted that the passband of filter 6 can be chosen all the more narrow as the frequency of the emission line of diode 1 is more stable. Thus, a stabilization in temperature of diode 1 allows the use of a filter with a very narrow band, for example, of ±1 nanometer, i.e., a filter very effective against stray light.

Iris 7 has the role of ridding the light received by photodetector 8 of the radiations not coming from the measuring volume because they are too offset relative to optical axis ZZ of the anemometer.

Figure 2:

FIG. 2 shows the anemometer according to FIG. 1, seen at one longitudinal end, i.e. from a point of optical axis ZZ located beyond measuring volume M. In this figure, there are shown only measuring axis XX, measuring volume M, the circumferences of emission lens 4 and receiving lens 5 and light beams A and B. The emission lens 4 makes light beams A and B converge toward measuring volume M after the beams A and B reach the emission lens 4 in passing on both sides of receiving lens 5.

As discussed during the description of FIG. 3, the anemometer according to FIGS. 1 and 2 makes it possible to determine the component of the relative speed vector according to axis XX. For piloting an aircraft, it is necessary to have the component of the relative speed vector in the vertical plane passing through the longitudinal axis of the aircraft. Now, with an aircraft, the relative speed vector is located in a cone known a priori, given by the builder of the aircraft. It, therefore, is possible, with two anemometers, whose measuring axes are placed correctly in the vertical longitudinal plane of the aircraft, to determine the component of the speed vector in this plane by the projections of this vector on these two axes.

This arrangement should be such that the speed vector is always located at the same angle between the two measuring axes, so that there is no ambiguity on its determination since the projections on the measuring axes are known in amplitude but not in sign. As the maximum displacement of the relative speed vector does not exceed, in general, 90 degrees in flight conditions, it is possible to place the two measuring axes at 45 degrees, on both sides of the longitudinal axis of the aircraft, to obtain the projections sought.

The measurement of the speed vector being obtained is by an average of the values given by the anemometer, and there is no determining the two above-mentioned projections on the same particle. It, therefore, is possible to dissociate the measuring volumes of the two anemometers while still leaving them in the same airflow. Such an embodiment is exhibited in FIG. 4. This figure shows two anemometers identical with the anemometer according to FIGS. 1 and 2, in an end view like that of FIG. 2 where the references relative to these two anemometers are those of FIG. 2 respectively followed by a 1 and a 2.

Figure 4:
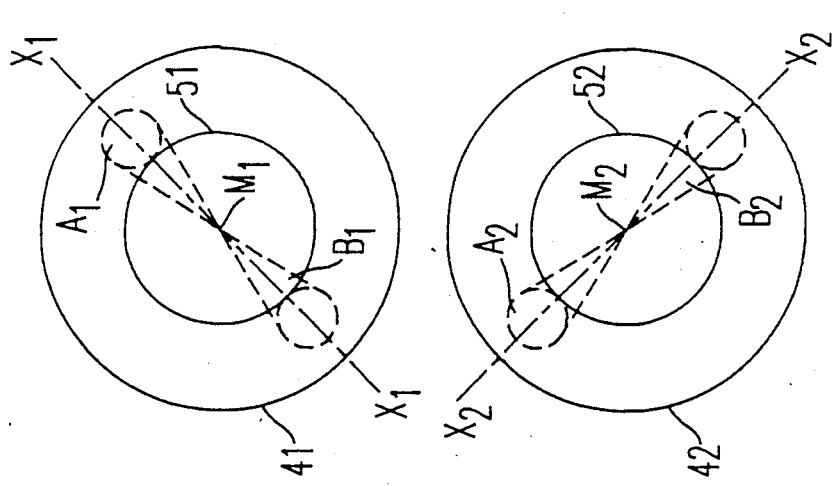
FIG. 4 shows two anemometers, each identical with the anemometer according to FIGS. 1 and 2, in an end view like that of FIG. 2, according to a further embodiment of the present invention.

The two anemometers of FIG. 4 are placed, for example, above one another and are related by about −45° and +45° around their longitudinal axis corresponding to axis ZZ of FIG. 1. It is understood that the different values can be chosen for these angles but while taking into account, as has been explained earlier, the maximum displacement of the relative speed vector.

Another possibility to determine the relative speed is to use a single anemometer like that of FIGS. 1 and 2 but by making its beam separator 3 rotate or oscillate around axis ZZ. The maximum values obtained for the relative speed correspond to particles whose paths are parallel to measuring axis XX and the minimum values to particles whose paths are practically perpendicular to axis XX. Such an embodiment is shown in FIG. 5.

Figure 5:
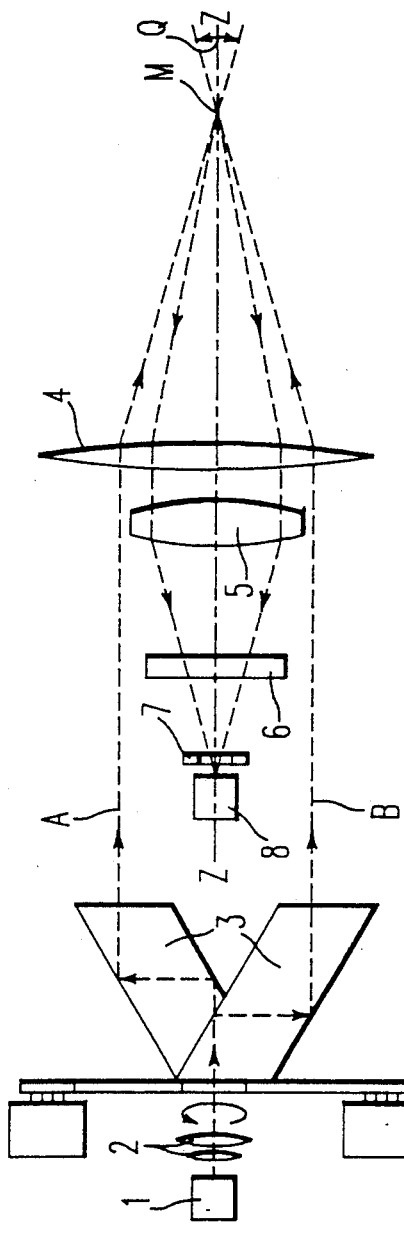
FIG. 5 is a side view of a rotatable anemometer according to yet another embodiment of the present invention.

The device according to FIG. 5 differs from the anemometer according to FIGS. 1 and 2 only by the addition of a rotating plate 30 driven by a motor 31 and coupled to an angular sensor 32 intended to provide a phase reference signal to make it possible to process the signal provided by photodetector 8. The rotating plate supports beam separator 3 and drives it in rotation around axis ZZ. In the case where the motor 31 drives the beam separator 3 in oscillations, the oscillations can be pendular, i.e. progressive like a clock pendulum, or can occur abruptly with stops of predetermined duration on the two end positions. In the latter case, the measurements are made only during the stops. In the case of complete rotations or progressive oscillations, the measurements are made with the separator 3 in movement.

Figure 7:
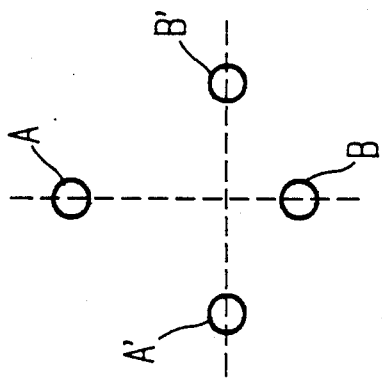
FIG. 7 is a front view of the anemometer of FIG. 6.
Figure 6:
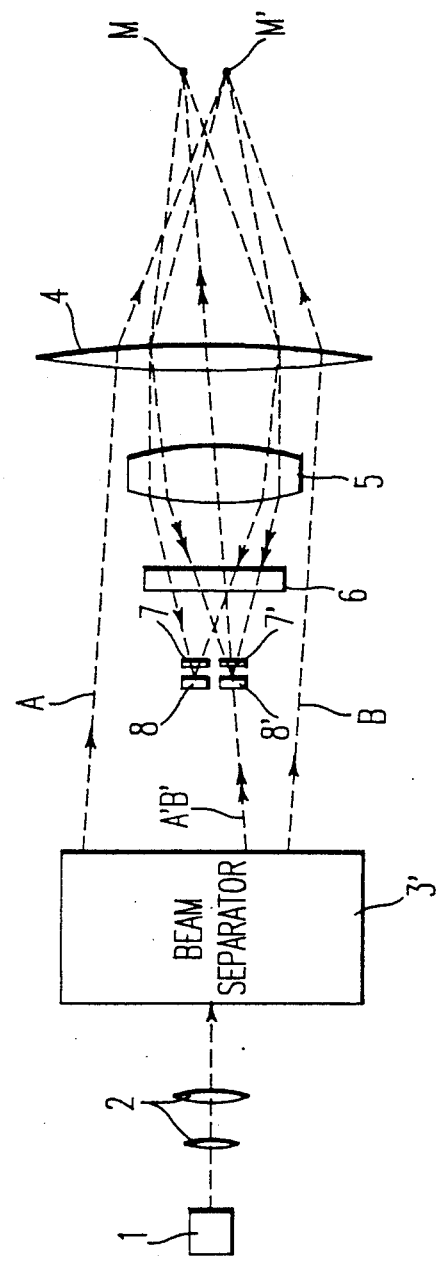
FIG. 6 is a side view of a double anemometer according to still a further embodiment of the present invention.

FIGS. 6 and 7 correspond to another on-board measuring device to obtain signals representative of the relative speed, relative to the air, of an aircraft. This device includes a double anemometer which is distinguished from that according to FIGS. 1 and 2 by a beam separator 3' with four output beams A, B, A', B', by two measuring volumes M and M', by two irises 7 and 7' and by two photodetectors 8 and 8'. The four beams are shown, in FIG. 7, in the output plane of separator 3. This figure shows that, in the output plane of separator 3, beam pair A'B' is offset by 90° relative to pair AB and that, moreover, its center is offset downward relative to the center of pair AB. This arrangement causes measuring volumes M and M', corresponding respectively to beams AB and A'B', to be distinct and the light coming from these measuring volumes is able to be focused on the two adjacent photodetectors 8, 8' without there being interference between the radiations coming from two measuring volumes M and M'. It should be noted that, taking into account the position of beams A'B' 90 degrees from that of beams AB, the measuring axes, not shown in FIG. 6 but corresponding to axis XX of FIG. 1, are vertical as in FIG. 1 for volume M and perpendicular to the plane of the figure for volume M'.

The device according to FIGS. 6 and 7 has been described with an angle of 90 degrees between the two measuring axes. In the case where the maximum displacement of the relative speed vector is less than 90 degrees, this angle between the measuring axes can be reduced to the value of this maximum displacement provided, however, as is moreover the case for the other devices, that the longitudinal axis of the aircraft is parallel to the bisector of this angle. It should be noted that photodetectors 8, 8', which are separated in FIG. 6, are actually, in the embodiment which has been used as an example, carried by the same support.

This invention is not limited to the examples described below. It applies, in particular, to the case where the coordinates of the speed vector are sought not in a plane, but rather in space, which necessitates at least three anemometers in the case where the measuring axes are stationary and at least two anemometers in the case where they are rotating or oscillating. In the case of three stationary measuring axes, the device can include, for example, devices according to FIGS. 4 or 6 and 7 joined to an anemometer according to FIGS. 1 and 2 with measuring volumes close to one another and, for example, an angle of 90 degrees between these two units. It also is possible to join, for example, an anemometer according to FIGS. 1 and 2 to a device according to FIG. 5 with, for example, an angle of 90 degrees between them and with their measuring volumes close to one another.

Likewise, the composition of devices according to the invention can be different from that of the devices described above. Thus, the beam separator or separators that, in the embodiments of which mention has been made, were made of mirrors, also can be made with optical fibers.

It also is possible not to use an iris and to place the light filters between the emission lenses and the receiving lenses.

Joined to an electronic circuit for processing the signals provided by its photodetector or photodetectors, the device according to the invention constitutes an on-board apparatus for measuring the relative speed of the vehicle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for obtaining signals representative of a relative speed of a vehicle with respect to an ambient fluid comprising:
   at least one fringe anemometer, positioned on board the vehicle, and having:
   a radiant energy emitting source for emitting a radiant energy beam,
   measuring volume forming means for forming the radiant energy beam into a measuring volume having at least an interference fringe and a measuring axis,
   a photodetector for receiving light reflected from the measuring volume and for generating output signals representative thereof, and
   an optical filter having a bandpass substantially at an emission frequency of the radiant energy beam of the radiant energy emitting source, the optical filter being position along an optical path extending between the measuring volume and the photodetector; and
   orienting means for orienting the measuring axis of the measuring volume of the at least one laser anemometer in at least two different directions so that the photodetector generates signals representative of light reflected from the measuring volume for the at least two different directions.

2. A device according to claim 1, wherein the radiant energy source is a laser diode.

3. A device according to claim 1, wherein the measuring volume forming means comprises a beam separator for splitting the radiant energy beam into at least two beams which convert toward the measuring volume and wherein the orienting means comprises a rotary support for rotating the beam separator about an axis extending between the beam separator and the measuring axis.

4. A device according to claim 3, wherein the rotary support drives the beam separator in a continuous rotational movement.

5. A device according to claim 3, wherein the rotary support drives the beam separator in an oscillating movement.

6. A device according to claim 5, wherein the oscillating movement is of a pendular type.

7. A device according to claim 5, wherein oscillating movement occurs with abrupt passage between two end positions with stops of predetermined duration at each end position.

8. A device according to claim 1, further comprising an iris positioned at the optical axis between the measuring volume and the photodetector.

9. A device according to claim 1, wherein the at least one fringe anemometer forms a double anemometer having a common diode laser as the radiant energy source, a beam separator as the measuring volume forming means, the beam separator forming four output beams, and two separate photodetectors.

10. A device for obtaining signals representative of a relative speed of a vehicle with respect to an ambient fluid comprising:
   n fringe anemometers positioned on board the vehicle, wherein n is a positive integer, each anemometer having:
      a radiant energy emitting source for emitting a radiant energy beam,
      measuring volume forming means for forming the radiant energy beam into a measuring volume having an interference fringe and a measuring axis,
      a photodetector for receiving light reflected from the measuring volume and for generating output signals representative thereof, and
      an optical filter having a bandpass substantially at an emission frequency of the radiant energy beam of the radiant energy emitting source, the optical filter being position along an optical path extending between the measuring volume and the photodetector,
   wherein the measuring axes of the measuring volumes of the n fringe anemometers extend in at least two separate directions.

11. A device according to claim 10, wherein the radiant energy source is a laser diode.

12. A device according to claim 10, wherein n is equal to two, wherein two respective measuring volumes are formed by the n fringe anemometers, the two respective measuring volumes being juxtaposed to one another, and wherein the measuring axes of the two respective measuring volumes are oriented at an angle with respect to one another.

13. A device according to claim 10, wherein the measuring volume forming means comprises a beam separator and wherein the orienting means comprises a rotary support for rotating the beam separator about an axis extending between the measuring volume and the beam separator.

14. A device according to claim 13, wherein the rotary support continuously rotates the beam separator.

15. A device according to claim 13, wherein therrotary support drives the beam separator in an oscillating movement.

16. A device according to claim 15, wherein the oscillating movement is of a pendular type.

17. A device according to claim 15, wherein oscillating movement occurs with abrupt passage between two end positions with stops of predetermined duration at each end position.

18. A device according to claim 10, wherein each of the n fringe anemometers further includes an iris positioned at the optical axis between the measuring volume and the photodetector.

19. A device according to claim 10, wherein n is at least equal to two and wherein two of the n anemometer form a double anemometer having a common diode laser as the radiant energy source, a beam separator as the measuring volume forming means, the beam separator forming four output beams, and two separate photodetectors.

* * * * *